United States Patent Office 3,278,571
Patented Oct. 11, 1966

3,278,571
YTTRIUM, DYSPROSIUM, AND YTTERBIUM ALKOXIDES AND PROCESS FOR MAKING SAME
Khodabakhsh S. Mazdiyasni, 2343 Skyview Drive, Dayton, Ohio; Charles T. Lynch, 387 Cherrywood Drive, Fairborn, Ohio; and Jonathan S. Smith II, 2607 Fairbanks Ave., Dayton, Ohio
No Drawing. Filed Mar. 19, 1965, Ser. No. 441,388
12 Claims. (Cl. 260—429.2)

The invention described herein may be manufactured and used by or for the United States Government for governmental purposes without the payment to any of us of any royalty thereon.

This invention relates to new compounds definable as alkoxides of yttrium, dysprosium, and ytterbium, to methods of producing the same, and to the decomposition thermally or hydrolytically of these alkoxides to high purity, fine particle yttrium oxide, dysprosium oxide, and ytterbium oxide.

An object of the present invention is to describe the novel processes for making alkoxides of the rare earth metals dysprosium, Dy of atomic number 66, and ytterbium, Yb of atomic number 70, and inclusive of the transition metal yttrium, Y of atomic number 39 and the decomposition of the alkoxides to high purity oxides. Due to the lanthanide contraction, the reactions and properties of Y, Dy, and Yb compounds are expected to be similar. Their ionic radii are 0.92, 0.92, and 0.85 A. respectively. They are all trivalent with electronegativities of 1.11, 1.10, and 1.06 respectively. Their alkoxides differ from those of trivalent aluminum which has an ionic radius of 0.51 A. and an electronegativity of 1.47. Because of differences in atomic size and bond polarity, many of the reactions employed for the alkoxides of Y, Dy, and Yb are significantly different from those of Al. [In the short form of the periodic table Al and Y are both Group III, but one has d-electrons (Y), and the other does not (Al).]

The products made are useful as precursor materials in the preparation of fine powders, films, and coatings of the oxides. The alkoxides decompose quantitatively to the oxides. The fine powders are useful in the stabilization of zirconium oxide, in the preparation of electronic insulators and oxidation resistant coatings, in clinical biochemistry, in adsorbents and catalysts, and the like. The products also are useful in forming stabilized high-temperature ceramic bodies and oxidation resistant coatings. The alkoxides may also be used in making high-temperature inorganic polymers.

The yttrium, dysprosium, and ytterbium alkoxides are compounds of the general formula $M(OR)_3$ where M is the metal and R is an organic group, such an alkenyl, an alkyl or an aryl group.

The alkoxides are compounds of an alkoxyl and a metal. The alkoxyls are radicals of an alkyl group and oxygen, such as methoxyl $CH_3O-$ or exthoxyl $C_2H_5O-$. The alkyls are monovalent hydrocarbon radicals, such as methyl, ethyl, etc. Hence the alkoxides are compounds of a monovalent hydrocarbon oxygen containing group and a metal. The alkenyls are univalent aliphatic radicals, each containing a double bond. The aryls are any uivalent aromic hydrocarbon radical, as phenol or tolyl, whose free valence belongs to the nucleus and not to a side chain. Alkenes are any hydrocarbon of the ethylene series, such as an olefin. A typical low molecular weight R group is the isopropyl group:

CH₃CHCH₃
|
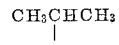

The previous available general methods of making alkoxides of transition metals, such as by reacting metal halides, with alcohols and ammonia in benzene, do not work when yttrium, dysprosium, or ytterbium are employed. The reaction of yttrium, dysprosium, and ytterbium with stoichiometric amounts of mercuric chloride and alcohols, which has also been employed to make other alkoxides, does not yield high purity alkoxides or alkene-free alkoxides of these metals.

The isopropoxides here of interest are made by reacting the metal with isopropyl alcohol under reflux with $HgCl_2$ as the catalyst. The term "catalyst" in this disclosure is defined as providing an alternate route for the reaction and thus accelerating the desired reaction and making it go to completion. It is not important whether the catalyst actually enters into the reaction or not. The amount of the catalyst $HgCl_2$ is extremely important in the preparation of the high-purity products contemplated hereby. Alkoxides with the heavier molecular weight R groups, such as, the tertiary butyl group $(CH_3)_3C-$ and the 2-hexoxy group CH₃CH(CH₂)₃CH₃
|
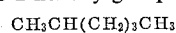

are prepared by an alcoholysis reaction of the isopropoxides with the corresponding alcohols in benzene.

It has been determined experimentally that yttrium, dysprosium, and ytterbium, in the form of thin metal shavings, may be caused to react quantitatively to form the isopropoxides where mercuric chloride is added to the mixture as the reaction-initiating catalyst and, by using very long reflux time of 24 hours or more.

Employing the general terms of M for metal, R for an organic group of which alky, aryl or alkene groups are representative, the reaction here involved is:

$$M + 3ROH \xrightarrow[HgCl_2 \text{ catalyst}]{82° C. \text{ reflux}} M(OR)_3 + 3/2H_2 \quad (1)$$

The action of the $HgCl_2$ is believed to be:

$$M + HgCl_2 + 3ROH \rightarrow M(OR)_3 + Hg + 2HCl + 1/2H_2 \quad (2)$$

with the free mercury formed continuing to act as a catalyst, as:

$$M + Hg \rightarrow M(Hg) \quad (3)$$

$$M(Hg) + 3ROH \rightarrow M(OR)_3 + Hg + 3/2H_2 \quad (4)$$

The amount of $HgCl_2$ that is used is 0.01 mole or less per mole of metal. If larger amounts of mercuric chloride are used, a side reaction takes place to form alkene-alkoxides where the mercury partially reduces the alkyl to an alkene, such as, from CH₃CHCH₃ to CH₃C=CH
|          | |
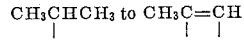

This reaction has been confirmed by infrared spectra, nuclear magnetic resonance spectra, and the like.

When a stoichiometric amount of the mercuric chloride is employed as catalyst, using reflux times of 48 hours or longer, the reaction goes to completion for forming the alkene-oxide. The reaction is:

$$M(OC_3H_7)_3 + 3HgCl_2 \rightarrow M(OC_3H_5)_3 + 6HCl + 3Hg \quad (5)$$

The formation of the alkene-oxide has also been confirmed by infrared spectra and the like.

For the isopropoxide formation, the use of more $HgCl_2$ than necessary, produces a product that is contaminated with chlorine which is very difficult to remove from the product. This contamination occurs even where the excess is 0.1 mole $HgCl_2$ per mole of the metal.

The purification of the isopropoxides so produced is accomplished after their filtration from the hot reaction mixtures by the recrystallization from hot isopropyl alcohol.

An alternative method for the preparation of the isopropoxides of yttrium, dysprosium, and yetterbium is to react the anhydrous metal trichloride with lithium isopropoxide as follows:

$$3LiOR + YCl_3 \xrightarrow[\substack{ROH \\ 45°\,C.}]{THF} Y(OR)_3 + 3LiCl \quad (6)$$

The reaction is carried out in a medium of isopropyl alcohol (ROH) and tetrahydrofuran (THF) at 45° C. After 3 hours reaction (reflux), the alcohol and tetrahydrofuran are distilled off at reduced pressure. The product is dissolved in benzene, filtered to remove LiCl, and again dried under reduced pressure. The isopropoxide product is further purified by recrystallization from hot isopropyl alcohol. This reaction is generally carried out using stoichiometric amounts of the reactants. This facilitates purification of the product.

The heavier alkoxides cannot be made quantitatively directly from the metals or metal halides. An alcoholysis method is employed to replace the isopropyl group with the heavier radicals. The reaction is done in benzene with azeotropic distillation of the isopropyl alcohol-benzene azeotrope that exhibts a maximum or a minimum boiling point. An illustrative example of the reaction is the formation of a 2-pentoxide from an isopropoxide as follows:

$$M(OC_3H_7)_3 + 3C_5H_{11}OH + nC_6H_6 \xrightarrow[C_6H_6]{C_5H_{11}OH}$$

$$M(OC_5H_{11})_3 + 3(C_3H_7OH \cdot nC_6H_6)$$
$$\text{azeotrope} \quad (7)$$

Any lower boiling compound can be made to exchange with a heavier R group in this manner. The general formula is:

$$M(OR)_3 + 3R'OH + nC_6H_6 \xrightarrow[C_6H_6]{R'OH} M(OR')_3 + 3(ROH \cdot nC_6H_6) \quad (8)$$

The reaction is done in excess R'OH and $C_6H_6$ and is driven to completion by driving off the azeotrope. In the Equation 8 the composition of the azeotrope $$ROH \cdot nC_6H_6$$

varies with the alcohol ROH and, hence the remainder of the azeotropic compound is indicated by $nC_6H_6$. The rise in the temperature of the boiling azeotropic reactants $R'OH \cdot nC_6H_6$ in the reaction (8) or of the $$C_5H_{11}OH \cdot nC_6H_6$$

in reaction (7) indicates the completion of the reaction. The product is purified by recrystallization if the product is a solid and by redistillation if the product is a liquid.

A limited number of heavier alkoxides of yttrium, dyspropsium, and yetterbium have been made by an ester exchange reaction as follows:

$$M(OR)_3 + 3R'OOCCH_3 \rightarrow M(OR')_3 + 3ROOCCH_3 \quad (9)$$

The reaction is carried out in an excess of the acetate, $R'OOCCH_3$, under reflux for 4 to 24 hours at the boiling point temperature of the lower-boiling acetate, $$ROOCCH_3$$

The product is purified after distilling off the $ROOCCH_3$ by recrystallization if the product is a solid and by redistillation if the product is a liquid. This reaction, however, does not produce high yields of the heavier alkoxides as do the alcoholysis reactions. Yields are less than 50% theoretical generally compared with yields of 70% or more for the alcoholysis reactions.

In the experimental production the isopropoxides of yttrium, dysproposium, and ytterbium have been made in quantity as the alkoxides: $Y(OC_3H_7)_3$, $Dy(OC_3H_7)_3$ and $Yb(OC_3H_7)_3$. It is believed that the partial decomposition of the isopropoxides during handling in the analytical procedures is evidenced by high residue and metal percentages when the product percentages are compared with the theoretical values, since the oxide is a decomposition product and the carbon and hydrogen in the product percentages are correspondingly lower than theoretical values. When very careful handling procedures have been followed by the analysts, results indicate a purity in excess of 99% theoretical. In this instance the percentage of free oxide in the product alkoxide can be considered negligible.

Alkoxides that have been made by the process that is disclosed herein illustratively are:

Yttrium isopropoxide—$Y(OC_3H_7)_3$
Yttrium isopropene-oxide—$Y(OC_3H_5)_3$
Yttrium tert-butoxide—$Y(OC_4H_9)_3$
Yttrium sec-pentoxide—$Y(OC_5H_{11})_3$
Yttrium sec-hexoxide—$Y(OC_6H_{13})_3$
Yttrium tert-heptoxide—$Y(OC_7H_{15})_3$
Dysprosium isopropoxide—$Dy(OC_3H_7)_3$
Ytterbium isopropoxide—$Yb(OC_3H_7)_3$ Also all other isomers of the $C_4H_9$—, $C_5H_{11}$—, and $C_6H_{13}$— have been synthesized. For example, yttrium n-butoxide, sec-butoxide, and tert-butoxide and the like. Innumerable other alkoxides can be made by the described procedures.

The alkoxides thermally decompose quantitatively to the oxides in extremely high purity. The reaction is as follows for yttrium isopropoxide:

$$2Y(OC_3H_7)_3 \xrightarrow{\Delta} Y_2O_3 + 3C_3H_7OH + 3C_3H_6 \quad (10)$$

The olefin and alcohol are volatile and thus removed from the product oxide. We have found that this decomposition is complete at 150–200° C. in dry air and at 250–300° C. in dry helium, argon, and nitrogen atmospheres. An ultra high purity submicron oxide from an alkoxide of these metals can be prepared by impinging the vapor of the alkoxide on a hot substrate. Many of these alkoxides cannot be vaporized without decomposition but can be sublimed. Typical sublimation temperatures at reduced pressures are:

$Y(OC_3H_7)_3$—200–210° C. at 0.1 mm. Hg
$Dy(OC_3H_7)_3$—190–200° C. at 0.17 mm. Hg
$Yb(OC_3H_7)_3$—190–200° C. at 0.2 mm. Hg

In the same manner of decomposition on a hot substrate, thin film coatings of the respective oxides can be prepared.

Hydrolytic decomposition results in the formation of oxy-alkoxy and finally oxides of yttrium, dysprosium, and ytterbium from the alkoxides as follows:

$$M(OR)_3 + HOH \rightarrow MO(OR) + 2ROH \quad (11)$$
$$\text{oxy-alkoxy}$$
$$2M(OR)_3 + 3HOH \rightarrow M_2O_3 + 6ROH \quad (12)$$

or:

$$2MO(OR) + HOH \rightarrow M_2O_3 + 2ROH \quad (13)$$

The oxide is recovered as a finely divided high purity product.

A unique reaction to form mixed oxides from the mixed alkoxides can be accomplished because the alkoxides of yttrium, dysprosium, and ytterbium can be dissolved in liquid alkoxides of other metals acting as solvents. For example, yttrium 2-hexoxide which is a gummy liquid (semi-solid) is dissolved in zirconium tetra-tertiary butoxide, $Zr(OC_4H_9)_4$, which is a liquid at STP. Water is added dropwise with vigorous stirring to assure rapid dispersal of the water leading to rapid and complete hydrolysis. The oxides precipitate from the resulting alcoholic solution as finely divided, homogeneous, intimately mixed oxides.

Up to 6 mole percent yttria ($Y_2O_3$) in zirconia ($ZrO_2$) mixtures prepared by this method were calcined at 1000° C. The resultant powder was stabilized in the cubic phase of zirconium oxide. The calcined powder was then cold-pressed and sintered at 1450° C. which resulted in the formation of a very high density (97–99% theoretical density) body. Normally yttria does not fully stabilize zirconia below 1800–2000° C. and commercial yttria-stabilized zirconia cannot be sintered to high densities below 1800° C.

Alternative methods of forming mixed alkoxides are to dissolve the yttrium, dysprosium, and ytterbium alkoxides and other metal alkoxides in a mutual solvent such as benzene, tertiary butyl acetate, and the like. These mixtures are then hydrolyzed to form the mixed oxides. An example of this is the solution of yttrium isopropoxide and zirconium isopropoxide $Zr(OC_3H_7)_4$ in benzene followed by hydrolysis.

It is to be understood that the processes that are described herein are illustrative of successfully operative procedure and that limited modifications may be made therein without departing from the spirit and the scope of the present invention.

We claim:

1. The process for making an alkoxide of a metal selected from the group that consists of yttrium, dysprosium, and ytterbium by reacting the metal with isopropyl alcohol under reflux with mercuric chloride, and isolating the product.

2. The process of making an yttrium alkoxide by combining yttrium with mercuric chloride and isopropyl alcohol and refluxing the mixture until the product is formed, and isolating the product.

3. The process of making a dysprosium alkoxide by combining dysprosium with mercuric chloride and isopropyl alcohol, and refluxing the mixture until the product is formed, and isolating the product.

4. The process of making an ytterbium alkoxide by combining ytterbium with mercuric chloride and isopropyl alcohol, and refluxing the mixture until the product is formed, and isolating the product.

5. The process for making alkoxides of a metal selected from the group that consists of yttrium, dysprosium, and ytterbium by combining the metal with an alcohol in stoichiometric proportions in the presence of mercuric chloride as catalyst and refluxing the mixture at about 82° C. to the formation of the product, and isolating the product.

6. The process of making an alkenyl oxide of the metal selected from the group that consists of yttrium, dysprosium, and ytterbium according to the reaction:

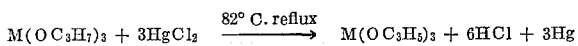

wherein M is a metal, and isolating the product.

7. The method for preparing an isopropoxide of a metal selected from the group of metals that consists of yttrium, dysprosium, and ytterbium by reacting an anhydrous metal trichloride of the selected metal with lithium isopropoxide, the reaction being carried out in a medium of isopropyl alcohol and tetrahydrofuran at 45° C., refluxing the mixture for about 3 hours, distilling off at reduced pressure the alcohol and tetrahydrofuran, dissolving the product in benzene, filtering the mixture to isolate the product in the filtrate, and drying the product under reduced pressure.

8. The alcoholysis method for making an alkoxide of a metal selected from the group that consists of yttrium, dysprosium, and ytterbium in benzene with the azeotropic distillation of an isopropyl alcohol-benzene azeotrope according to the reaction in the formation from a metal isopropoxide to a 2-pentoxide according to the reaction wherein the letter M indicates one of the said metals and the letter $n$ is an integer as follows:

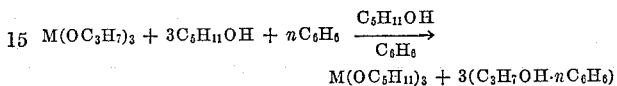

and recovering the selected metal alkoxide from the distillate.

9. The composition of matter yttrium sec-pentoxide of the formula $Y(OC_5H_{11})_3$.

10. The composition of matter yttrium sec-hexoxide of the formula $Y(OC_6H_{13})_3$.

11. The composition of matter yttrium tertiary heptoxide, also known as yttrium 3-ethyl-3-pentoxide of the formula $Y(OC_7H_{15})_3$.

12. The process for making alkoxides of a metal selected from the group that consists of yttrium, dysprosium, and ytterbium by combining the metal with an alcohol in stoichiometric proportions in the presence of about .01 mole of mercuric chloride as a catalyst and refluxing the mixture.

References Cited by the Examiner

UNITED STATES PATENTS

| | | | |
|---|---|---|---|
| 2,539,282 | 1/1951 | Spedding et al. | 260—429.2 |
| 2,735,747 | 2/1956 | Kasey | 23—16 |
| 2,773,737 | 12/1956 | Nielsen et al. | 23—16 |
| 3,107,259 | 10/1963 | Schwarzenbach | 260—429.2 |

OTHER REFERENCES

Lynch et al., American Chemical Society Abstracts of Papers, 148th meeting, Aug. 31 to Sept. 4, 1964, page 17B.

Lynch et al., Nuclear Science Abstracts, vol. 19, No. 5, pages 858–859 (Mar. 15, 1965).

Lynch et al., Nuclear Science Abstracts, vol. 19, page 1905, May 15, 1965.

BENJAMIN R. PADGETT, *Acting Primary Examiner.*

CARL D. QUARFORTH, L. DEWAYNE RUTLEDGE, *Examiners.*

L. A. SEBASTIAN, *Assistant Examiner.*